United States Patent
Hellgren et al.

(10) Patent No.: US 10,764,955 B2
(45) Date of Patent: Sep. 1, 2020

(54) MICROWAVE LINK TRANSMISSION CONTROL WITH TRANSMISSION OF LOW RATE DUMMY DATA

(71) Applicant: Telefonaktiebolaget LM Ericsson (publ), Stockholm (SE)

(72) Inventors: Filip Hellgren, Kållered (SE); Björn Gävert, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 137 days.

(21) Appl. No.: 15/565,583

(22) PCT Filed: Apr. 29, 2015

(86) PCT No.: PCT/EP2015/059434
§ 371 (c)(1),
(2) Date: Oct. 10, 2017

(87) PCT Pub. No.: WO2016/173655
PCT Pub. Date: Nov. 3, 2016

(65) Prior Publication Data
US 2018/0124863 A1    May 3, 2018

(51) Int. Cl.
*H04W 76/25* (2018.01)
*H04W 28/00* (2009.01)
(Continued)

(52) U.S. Cl.
CPC .......... *H04W 76/25* (2018.02); *H04L 1/0003* (2013.01); *H04L 1/0009* (2013.01); *H04L 27/20* (2013.01);
(Continued)

(58) Field of Classification Search
CPC .. H04L 1/0003; H04L 1/10009; H04W 24/08; H04W 76/25
See application file for complete search history.

(56) References Cited

U.S. PATENT DOCUMENTS

| 6,404,755 B1 | 6/2002 | Schafer |
| 6,990,059 B1 | 1/2006 | Anikhindi |

(Continued)

FOREIGN PATENT DOCUMENTS

| CN | 103200121 A | 7/2013 |
| CN | 103299689 A | 9/2013 |

(Continued)

OTHER PUBLICATIONS

Translation of Russian Search Report, •2017135389/08(061755), dated Sep. 9, 2018, 2 Pages.

(Continued)

*Primary Examiner* — Rhonda L Murphy
(74) *Attorney, Agent, or Firm* — Sage Patent Group

(57) ABSTRACT

The present disclosure relates to methods and arrangements for controlling point-to-point microwave transmission on a microwave link between a first and a second microwave network node, wherein the microwave link is configured for payload data transmission at a payload data rate. The method comprises obtaining information indicative of a current data rate capability of the microwave link and comparing the current data rate capability to the configured payload data rate. When the current data rate capability is below the configured payload data rate, transmission on the microwave link is adapted to comprise transmission of dummy data on the microwave link between the first and second microwave network node.

20 Claims, 4 Drawing Sheets

(51) Int. Cl.
*H04L 1/00* (2006.01)
*H04W 40/04* (2009.01)
*H04L 27/20* (2006.01)
*H04W 24/04* (2009.01)
*H04W 24/08* (2009.01)
*H04L 12/801* (2013.01)
*H04W 84/04* (2009.01)
*H04W 92/20* (2009.01)

(52) U.S. Cl.
CPC .......... *H04W 24/04* (2013.01); *H04W 24/08* (2013.01); *H04W 28/00* (2013.01); *H04W 40/04* (2013.01); *H04L 47/14* (2013.01); *H04L 2001/0097* (2013.01); *H04W 84/045* (2013.01); *H04W 92/20* (2013.01); *Y02D 50/10* (2018.01)

(56) References Cited

U.S. PATENT DOCUMENTS

| | | | |
|---|---|---|---|
| 2005/0132416 A1* | 6/2005 | Wasilewski | H04N 1/00291 725/133 |
| 2006/0002338 A1* | 1/2006 | Guo | H04W 52/267 370/328 |
| 2006/0179201 A1* | 8/2006 | Riedel | G09G 5/006 710/305 |
| 2009/0092072 A1 | 4/2009 | Imamura | |
| 2010/0121974 A1* | 5/2010 | Einarsson | H04L 47/10 709/231 |
| 2010/0150168 A1* | 6/2010 | Chatterjee | H04N 21/2365 370/465 |
| 2011/0243007 A1 | 10/2011 | Xiao | |
| 2012/0051339 A1* | 3/2012 | Chamberlain | H04L 1/0002 370/337 |

FOREIGN PATENT DOCUMENTS

| | | |
|---|---|---|
| CN | 103888338 A | 6/2014 |
| RU | 2010110620 A | 9/2011 |
| WO | WO 2009/026400 A1 | 2/2009 |

OTHER PUBLICATIONS

Translation of Decision on Grant, "Gorodissky & Partners" Law firm Ltd., B. Spasskaya str., 25, bldg. 3, Moscow, 129090, Russia, 7 Pages.
TD Tech, "Clarification on Operation of DL SPS Transmission for 1.28Mcps TDD," 3GPP Draft; R2-101383 25.308 CR(REL-9,A) $3^{rd}$ Generation Partnership Project (3GPP) Mobile Competence Centre, vol. 1, RAN WG2, No. San Francisco, USA, Feb. 22, 2010, Feb. 14, 2010, XP050421471, 4 pages.
Crismani, A., et al., "Cross-Layer Solutions for Cooperative Medium Access Control Protocols," 2010 IEEE Vehicular Technology Conference (VTC 2010—Spring)—16-19 May 16-19, 2010, Taipei, Taiwan, IEEE, US, May 16, 2010, XP031696103, pp. 1-5.
International Search Report and Written Opinion of the International Searching Authority, International Application No. PCT/EP2015/059434, dated Jan. 8, 2016, 11 pages.
English Translation of Chinese Search Report for Chinese Application No. 201580079329.4 dated May 25, 2020, 2 pages.
Chinese Office Action for Chinese Application No. 201580079329.4 dated May 29, 2020, 8 pages.

* cited by examiner

```
50 Microwave Link Controller
  51 Processing Circuitry
    511 Processor      512 Memory
```

MICROWAVE LINK TRANSMISSION CONTROL WITH TRANSMISSION OF LOW RATE DUMMY DATA

CROSS REFERENCE TO RELATED APPLICATIONS

This application is a 35 U.S.C. § 371 national stage application of PCT International Application No. PCT/EP2015/059434 filed on Apr. 29, 2015, the disclosure and content of which is incorporated by reference herein in its entirety.

TECHNICAL FIELD

The present disclosure relates to methods and arrangements for transmission control in a microwave link, and in particular in a microwave link configured for adapting a spectral efficiency of data transmission.

BACKGROUND

In microwave communication networks, there is always a challenge to obtain good performance given varying conditions in the physical environment in which the microwave link is deployed.

Microwave links have traditionally been configured for transmission at a fixed data rate, i.e., using a fixed modulation and coding scheme; or in other words set for a fixed scenario with certain margin to guarantee a certain data transport capacity and link availability.

The fixed modulation and coding scheme is usually set for a worst case scenario representing transmission conditions which only occur very seldom. When the transmission conditions of a fixed rate microwave link are improved, there is no impact on the data transport capacity of the microwave link. In a case with deteriorated transmission conditions, the quality of the channel may fall below what is required for the given modulation and coding scheme and the link will be unavailable, i.e., the link will go down. The traffic flows affected by the link down state may in many instances be redirected over other links in a network.

Some microwave link based networks implement the possibility of so-called adaptive coding and modulation, ACM or adaptive coding, modulation and baud rate; in the following presented as ACM(B). Using ACM(B), the transmission rate of a microwave link is adapted to current propagation conditions in real-time; when channel conditions of the link are favorable a higher transmission rate is used and when conditions link deteriorate, e.g., due to changing weather conditions, the transmission rate is decreased to a lower transmission rate.

The use of ACM(B) at least in theory provides an improved microwave link network, since coding and modulation are adjusted according to current RF propagation conditions. However, during shifting propagation conditions, microwave links in a network may change offered data rates over a large range which can lead to instability on a network level. Therefore, in order to provide a stable network, microwave links are often configured to only offer ACM(B) over a limited range of data rates, or not at all.

When propagation conditions go below a threshold level, the microwave link, as mentioned above, may go down. This is not a preferred event, since the effort of re-activating the link may be time-consuming. Therefore, there is a need to provide a solution that enables quick recovery of a microwave link following radio link failure, while maintaining network stability.

SUMMARY

It is an object of the present disclosure is to provide methods and arrangements for transmission control in a microwave link, which seek to mitigate, alleviate, or eliminate one or more of the above-identified deficiencies in the art and disadvantages singly or in any combination.

This object is achieved by a method, performed in a microwave link controller, for controlling point-to-point microwave transmission on a microwave link between a first and a second microwave network node, wherein the microwave link is configured for payload data transmission at a payload data rate. The method comprises obtaining information indicative of a current data rate capability of the microwave link and comparing the current data rate capability to the configured payload data rate. When the current data rate capability is below the configured payload data rate, transmission on the microwave link is adapted to comprise transmission of dummy data on the microwave link between the first and second microwave network node.

The present disclosure provides the benefit of upholding the ability for control plane data exchange even when the channel conditions of the microwave link has deteriorated so that a current data rate capability is below a configured payload data rate, thereby maintaining the link in a connected state even though transmission of payload data is no longer supported. When the conditions of the microwave link improves so that a current data rate capability of the microwave link meets the configured payload data rate, transmission of the payload data may be resumed without having to recover the microwave link connection from a down state.

Maintaining transmission of control plane data is beneficial for both individual radio link stability as well as network stability.

Consequently, there is provided a solution that enables quick recovery of a microwave link following radio link failure, while at the same time maintaining network stability due to the transmission of dummy data and upholding of control plane data transmission.

According to an aspect of the disclosure, transmission on the microwave link is adapted in that the dummy data is transmitted in lieu of the payload data.

Transmission of dummy data in lieu of actual payload data provides the benefit of ensuring that the microwave link is upheld without jeopardizing transmission of actual payload data.

According to another aspect of the disclosure, the payload data is rerouted on a microwave link from the first network node to a third network node when a current data rate capability is below the configured payload data rate.

Thus, the present disclosure provides a method that benefits from path redundancies created in the microwave network topology, e.g., in a microwave based mobile backhaul network. Tree, necklace, ring and meshed topologies provide advantageous examples of path redundant topologies where microwave link control may comprise rerouting of payload data.

According to a further aspect of the present disclosure, transmission of payload data on the microwave link is disabled when the current data rata capability is below the configured payload data rate.

The disabling of transmission of payload data provides the benefits that the microwave link is maintained by only transmitting dummy data on the microwave link. Also, network stability can benefit from the disabling of transmission of payload data, while upholding transmission of control plane data.

According to another aspect of the disclosure, the payload data rate is a fixed payload data rate and the dummy data is transmitted at a data rate below the fixed payload data rate.

Thus, the disclosed method is applicable to a traditional microwave link configuration using a fixed modulation and coding scheme, but where transmission of dummy date at a data rate below the link configuration provides for a quicker re-establishment of communication on the microwave link when transmission at the fixed payload data rata is enabled again.

According to another aspect of the disclosure, the microwave link is arranged for adaptive modulation, adaptive coding, adaptive coding and modulation, ACM, or adaptive coding modulation and baud rate, ACM(B), and wherein the dummy data is transmitted at a pre-configured lowest transmission rate or at a transmission rate below the fixed payload data rate.

Consequently, the disclosed method is applicable and beneficial also in a scenario of ACM(B), allowing the use of a lower or lowest transmission rate below a lowest allowable payload data rate.

According to an aspect of the disclosure, the adapting of the transmission on the microwave link comprises selecting a lower modulation order when the current data rate capability is below the configured payload data rate, and selecting a higher modulation order when the current data rate capability is at or above the configured payload data rate.

According to another aspect of the disclosure, the adapting of the transmission on the microwave link comprises selecting a modulation order and/or a coding with a lower spectral efficiency in terms of bits/sec/Hz when the current data rate capability is below the configured payload data rate, and selecting a spectral efficiency in terms of bits/sec/Hz when the current data rate capability is at or above the payload data rate.

Accordingly, the disclosed method allows the full benefits of an adaptive coding, modulation and bandwidth, ACM(B), enabled microwave link, while reducing the impact of rapid network state changes that may be detrimental to performance at a network level. Consequently, the present disclosure provides for an improved ACM(B) function.

According to an aspect of the disclosure, the method further comprises repeating the step of obtaining information indicative of a current data rate capability of the microwave link and comparing the current data rate capability to the configured payload data rate. When the current data rate capability is on or above configured payload data rate the payload data is transmitted on the microwave link.

Thus, the disclosed method provides real-time adjusting of the microwave link to transmission of payload data based on a current data rata capability of the microwave link to optimize use of the microwave link transmission capacity.

According to other aspects of the disclosure, a current data rate capability below the configured payload data rate is indicative of a bandwidth reduction of the microwave link; a signal to noise ratio, SNR, reduction of the microwave link; and/or an increase in interference of the microwave link.

Consequently, the presented method provides the advantages of addressing all possible situations for microwave link impairment; e.g., due to weather conditions or other type of temporary conditions affecting the quality of the microwave link.

According to a further aspect of the disclosure, the method comprises adapting transmission on the microwave link by transmitting control plane data on the microwave link.

It is a particular advantage of the present disclosure, that transmission of control plane data may be maintained for the microwave link. Consequently, the microwave link is maintained in a link connected state, capable of resuming communication of payload data as soon as the current data rate is sufficient for the required payload data rate.

According to another aspect, the method comprises transmitting the control plane data at a default lowest order modulation of binary phase shift keying, BPSK, or 4 or 16 quadrature amplitude modulation, QAM.

According to aspects, the method comprises transmitting the control plane data at a lower order modulation, down to binary phase shift keying, BPSK.

According to an aspect of the disclosure, the microwave link is a high capacity backhaul link and the first and second network nodes are small radio base stations, RBSs, of a wireless communication network, e.g., pico eNBs of a 3GPP LTE network.

According to a further aspect of the disclosure, the microwave controller is further arranged to control transmission on at least a further microwave link between nodes of a microwave network.

Consequently, the disclosed method may advantageously be performed for controlling point-to-point transmission on multiple microwave links, either by means of one microwave link controller performing the method for a plurality of microwave links or by means of a plurality of microwave link controllers each performing the method for a microwave link.

Summarizing advantages of the method aspects, the disclosed method aspects will contribute to faster lock-in times after link loss, maintenance of control loops and control plane signaling resulting, e.g., in reduced disturbance on other links, and support for fixed high order modulations perceived from a network perspective.

The object is also achieved by microwave link controller arrangements configured to control point-to-point microwave transmission on a microwave link configured for payload data transmission at a payload data rate between a first and a second microwave network node.

According to an aspect of the disclosure, the microwave link controller comprises processing circuitry configured to obtain information indicative of a current data rate capability of the microwave link and to compare the current data rate capability to the configured payload data rate. When the current data rate capability is below the configured payload data rate, the processing circuitry is configured to adapt transmission on the microwave link to comprise transmission of dummy data on the microwave link between the first and second microwave network node.

According to another aspect of the disclosure, the microwave link controller comprises a data rate capability module configured to obtain information indicative of a current data rate capability of the microwave link and a capability comparison module configured to compare the current data rate capability to the configured payload data rate. When the current data rate capability is below the configured payload data rate, a transmission adaption module of the microwave controller is configured to adapt transmission on the microwave link to comprise transmission of dummy data on the microwave link between the first and the second microwave network node.

According to a further aspect of the disclosure, the microwave link controller comprises an I/O interface, a digital signal processor, a comparator, a de-multiplexing unit and a multiplexing unit. The I/O interface is configured to receive a data signal on a microwave link. The digital signal processor is configured to obtain information indicative of a current data rate capability by processing the data signal. The comparator is configured to receive the current data rate capability from the digital signal processor and to compare the current data rate capability to a configured payload data rate. The de-multiplexing unit is configured to separate payload data and control data received from the digital signal processor. The multiplexing unit is configured to multiplex dummy data with payload data on the microwave link when the current data rate capability is below the configured payload data rate.

The object is further achieved by a microwave network node configured for payload data communication at a payload data rate with at least one further microwave network node. The microwave network node comprises a communication interface comprising one or more microwave transceivers and a microwave link controller according to any of the above disclosed microwave link controller arrangements.

The object is also achieved by a computer readable storage medium having stored thereon computer program which, when run in a microwave link controller causes the microwave link controller to perform any of the above disclosed method aspects.

The microwave link controller arrangements, the microwave network node and the computer readable storage medium each display advantages corresponding to advantages described for the corresponding methods and aspects of the methods.

DETAILED DESCRIPTION

Figure 1:
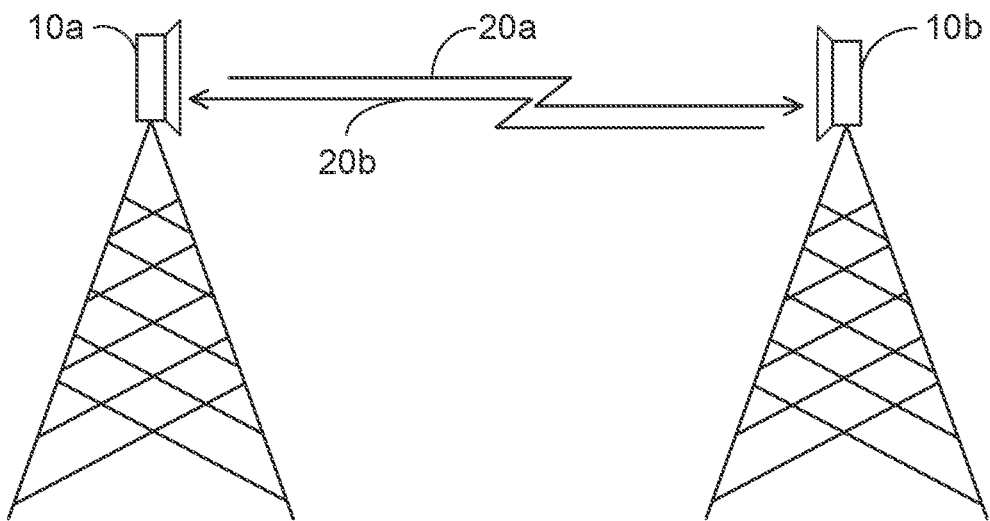
FIG. 1 Illustrates a microwave link between a first and a second microwave network node.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

For the illustration of operations of a method embodiment, it should be appreciated that the operations need not necessarily be performed in disclosed order if not stated otherwise in this disclosure. Furthermore, it should be appreciated that not all of the operations need to be performed. The example operations may be performed in any suitable order and in any combination of the illustrated embodiments in the figures.

Herein, the terms payload data and user data are used interchangeably, and should be construed as encompassing any type of information transported over the radio link, except for control plane data used to maintain and/or manage the radio link connection.

FIG. 1 illustrates microwave links 20a, 20b established between a first and a second microwave network node enabling two-way communication between the microwave network nodes. The disclosed microwave links are either configured with a fixed modulation and coding, e.g., set for a default scenario representing normal transmission conditions, or with an adaptive coding and modulation, ACM or adaptive coding, modulation and baud rate, in the following presented as ACM (B). Using ACM(B), the transmission rate of a microwave link is adapted to current propagation conditions in real-time; when channel conditions of the link are favourable a normal transmission rate is used and when conditions link deteriorate, e.g., due to changing weather conditions, the transmission rate is decreased.

When using fixed modulation and coding a microwave link will be unavailable when the quality of the channels falls below what is required for a given configuration, e.g., in the case with deteriorated transmission conditions. In an ACM(B) link configuration, limits are set for the highest and lowest modulations that may be used, the lowest because the user wants a certain lowest capacity over the link. The lowest modulation in use with ACM(B) provides for maintaining the link in operation longer than would have been the case in the default scenario, thereby maintaining the microwave link in an active state. If the quality of the channel is worse than a predetermined minimum value, the link is determined to be unavailable for traffic, i.e., in a link down state.

When conditions of a channel become good enough, either for a microwave link configured with a fixed modulation and coding or a microwave link configured with ACM(B), the link is reactivated and capable of contributing to the traffic flow in the microwave network. However, the effort of re-activating the link may be time-consuming. Therefore, there is a need to provide a solution that enables quick recovery of a microwave link following radio link failure.

Some of the reasons that it takes time to set up a microwave radio link starting from a down state include that many control functions and adaptive loops are needed to converge to a stable state before payload traffic can be sent over the radio hop without transmission errors. Examples include automatic transmit power control, ATPC, digital pre-distortion, DPD, adaptive equalization, adaptive interference cancellation, cross-polar interference cancellation, XPIC, and multiple-input multiple-output, MIMO, processing.

Herein, 'a modulation' refers to a signal modulation designed to carry a given number of bits per transmitted symbol. A high modulation carries more bits/symbol than a low modulation. For instance, 1024 quadrature amplitude modulation, QAM, carries ten bits per symbol and can be considered a relatively high modulation, while 4-QAM only carries two bits per symbol and can be considered a low modulation. Other modulation format examples include phase shift keying, PSK, orthogonal frequency division multiplexing, OFDM, and code division multiple access, CDMA.

Herein, 'a coding' refers to a channel code, such as a low-density parity check, LPDC, code, Reed-Solomon code, or turbo code. Such codes can often be characterized by their ratio of information bits to coded bits, or code rate. 'High coding' usually refers to a coding scheme with low spectral efficiency in terms of bits/sec/Hz as opposed to 'low coding' which uses less redundancy. However, 'high modulation and coding' refers herein to modulation and coding schemes with high spectral efficiency, i.e., where a large number of information bits per second and Hertz are transmitted, and 'low modulation and coding' refers to modulation and coding schemes with low spectral efficiency, i.e., where a smaller number of information bits/sec/Hz are transmitted.

Figure 2:
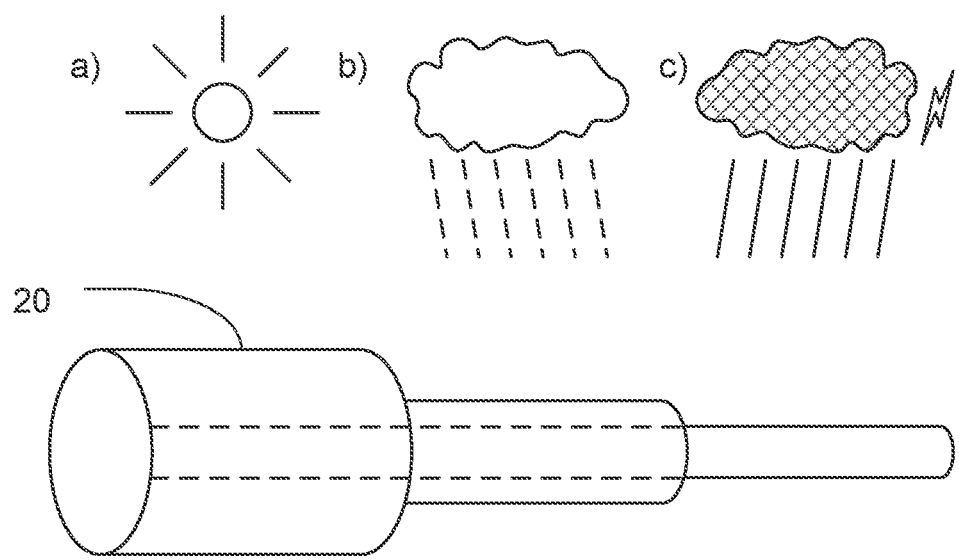
FIG. 2 Illustrates the impact on microwave link quality from varying weather conditions FIG. 3 Illustrates an example microwave network including microwave network nodes FIG. 4 Illustrates method steps performed in a microwave link controller embodiment FIG. 5 Illustrates a microwave link controller embodiment FIG. 6 Illustrates a microwave link controller embodiment FIG. 7 Illustrates an example microwave link controller embodiment

FIG. 2 illustrates the impact on a microwave link quality from varying weather conditions. Several common physical phenomena influence the effective bandwidth of a radio link implementing fixed or adaptive modulation and consequently also impacts the communications signal received in a receiving microwave network node. Information relating to a current data rate capability, e.g., a modulation order and/or coding providing for an undisrupted payload data transfer; a determined or estimated bandwidth of the microwave link; or a determined or estimated signal to noise ratio (SNR) or signal to interference and noise ratio (SINR), is derivable from the received communications signal, e.g., in a microwave link controller as will be presented further on in this disclosure. A communications signal on a microwave link may be attenuated when deteriorating weather conditions are experienced, such as illustrated in FIG. 2. When the external conditions are good, e.g., when experiencing sunshine and clear skies, the data rate capability of the microwave link allow for an unperturbed payload data transfer, while poor external conditions, e.g., wind, rain, hail or the like, will have a negative impact on the data rate capability and thus on the ability for payload data transfer. As previously discussed, ACM(B) may be used to adapt the modulation, coding, and baud rate to the external conditions so that payload data transfer will be maintained despite attenuation of the microwave link. However, even when deploying ACM(B) the situation may arise where the external conditions are such that payload data transfer may no longer be performed at a lowest acceptable modulation rate or baud rate.

Figures 3, 5:
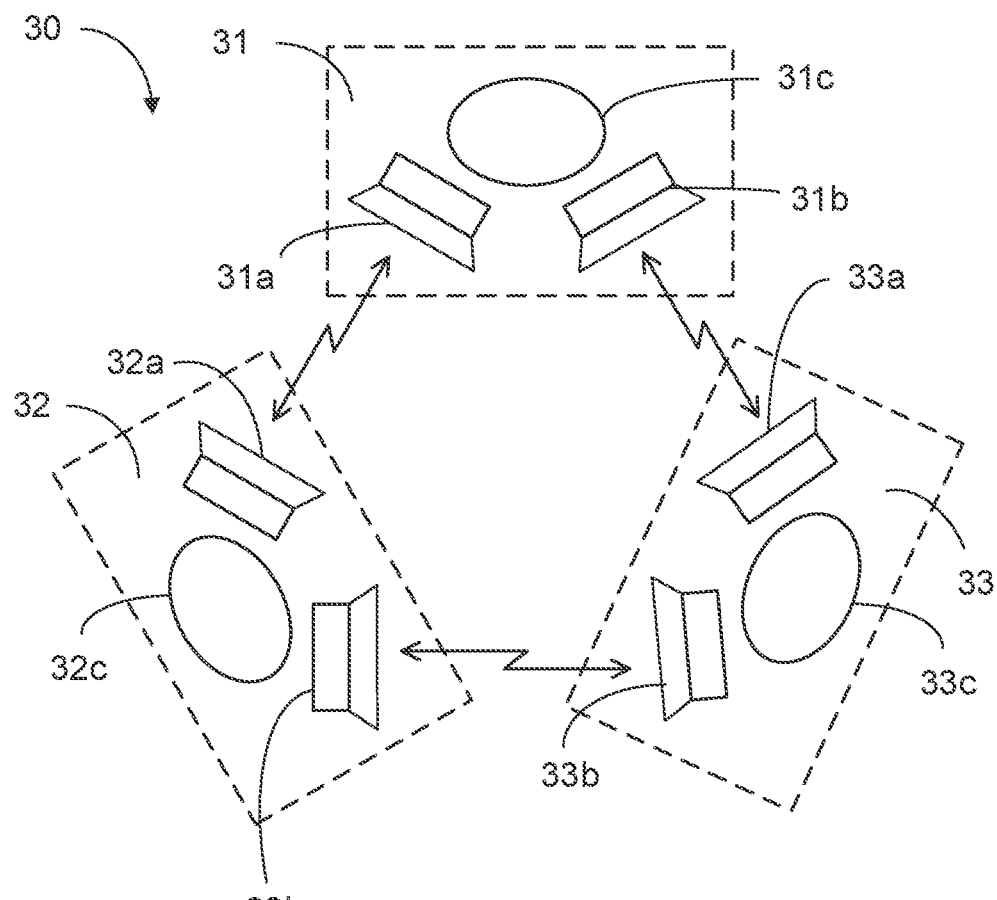

FIG. 3 illustrates a microwave network introducing redundancy in a path between a first and a second network node. FIG. 3 illustrates a small microwave based ring network 30 connecting three network nodes 31, 32, 33. In this network, a data flow from a first network node 31 to a second network node 32 may either be communicated directly in a point-to-point communication between a first microwave transceiver 31a of a first network node 31 and a second microwave transceiver 32a of a second network node, or by means a multitude of point-to-point communications. A second microwave transceiver 31b of the first network nodes communicates with a first microwave transceiver of a third network node 33, a second microwave transceiver 33b communicates with a second microwave transceiver of the second network node, thereby providing an alternative path for communicating between the first network node 31 and the second network node 32. The disclosed alternative route represents a rerouting option for the situation when the first communication link, the point-to-point link, between the first network node 31 and the second network node 32 is determined not to meet a configured payload data rate. In such a situation, the first communication link is considered to be in a link down state, i.e., being unavailable for payload data delivery.

The link down state is determined by obtaining information on the current eligible data rate for point-to-point communication between the first and the second network node and comparing this current data rate to a configured payload data rate.

Suppose links in the network of FIG. 3 implement ACM, and that propagation conditions vary over time. It may then happen that traffic streams flowing from the first node to the second node are routed first directly, and then via the alternative path, and the directly again. This type of changes may lead to oscillations in traffic flows on a network level, which is detrimental to network stability. Partly because of such effects, network operators are at times reluctant to enable ACM on microwave links.

Furthermore, some microwave links operate as fiber replacement in optical networks for data transport. Operators then normally disable ACM since the surrounding optical transport system has no provisions for making use of such variations in data transport capacity.

Figure 4:
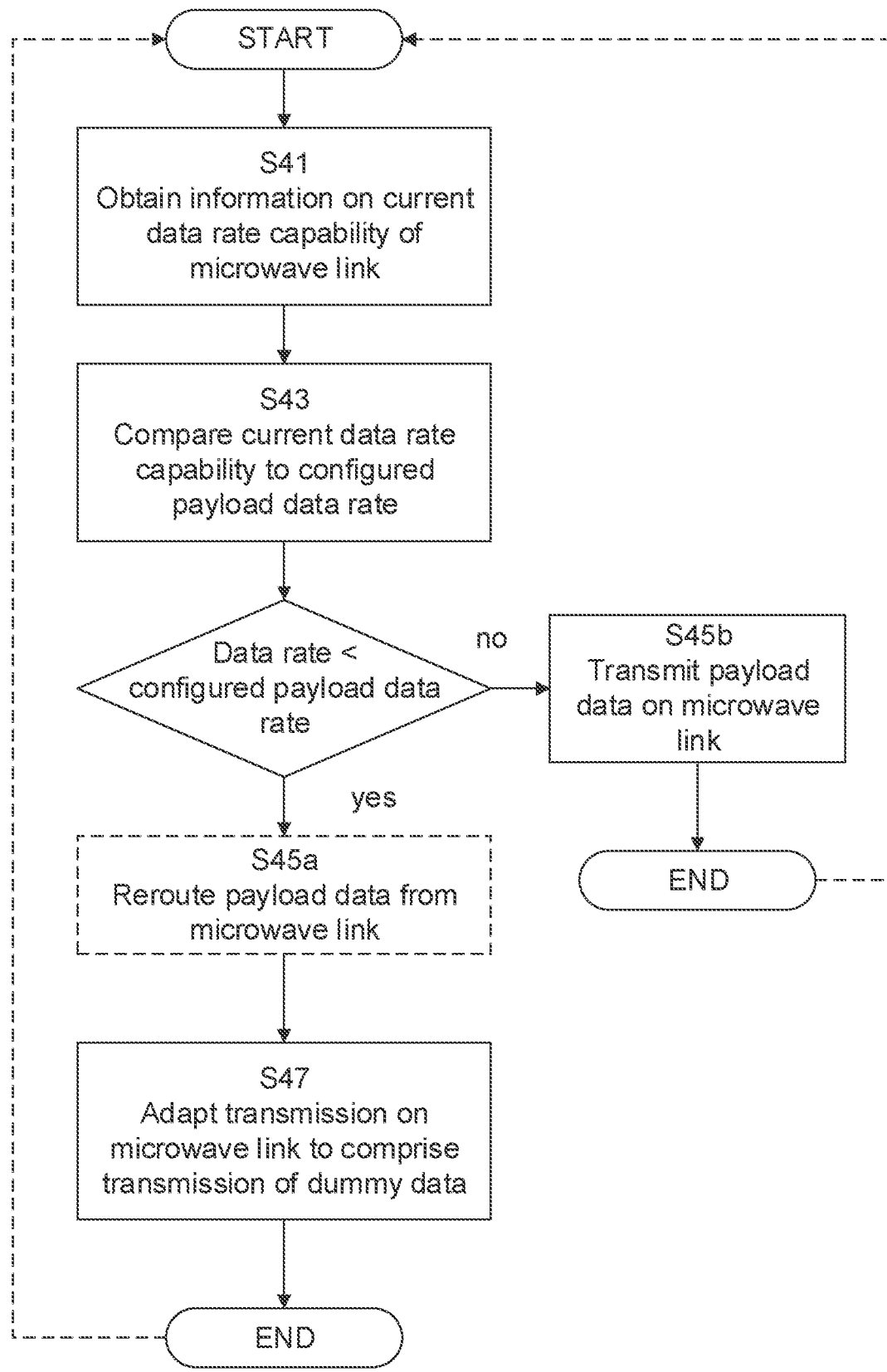

A method for microwave link control will now be discussed with reference to the flowchart of FIG. 4, illustrating example operations performed in a microwave link controller, e.g., as disclosed in FIGS. 5 to 7. According to the present disclosure, the microwave link is configured for point-to-point microwave transmission on a microwave link between a first and a second microwave network node. The microwave link is configured for payload data transmission at a payload data rate. The microwave link is either configured for fixed modulation and coding or configured for implementing ACM(B). The disclosure is not limited by these known microwave link configuration options, but is also applicable to other link configurations where a microwave link is configured for payload data transmission at a payload data rate. At each instance for the link connection, a payload data rate is configured for the link, i.e., a transmission rate for payload data/user data to be transmitted on the microwave link.

In one context, the disclosed method of controlling point-to-point microwave transmission on a microwave link between a first and a second microwave network node comprises obtaining S41 information indicative of a current data rate capability of the microwave link and comparing S43 the current data rate capability to the configured payload data rate. As previously discussed in relation to FIG. 2, information indicative of the current data rata capability comprises, e.g., a modulation order and/or coding providing for an undisrupted payload data transfer; a determined or estimated bandwidth of the microwave link; and/or a determined or estimated signal to noise ratio (SNR) or signal to interference and noise ratio (SINR). The information indicative of the current data rate capability is derivable from the received communications signal, e.g., in a microwave link controller. When the current data rate capability is below the configured payload data rate, in other words when the the quality of the microwave link is below what is required for a selected modulation; coding; and/or baud rate, transmission on the microwave link is adapted S47 to comprise transmission of dummy data on the microwave link between the first and second microwave network node. Thus, payload data transmission on the microwave link comprises transmission of dummy data.

It is appreciated that many radio links transmit payload data in parallel with control plane data. It is further appreciated that the present technique attempts to maintain transmission of control plane data at all times, while transmitting dummy data intermittently. Examples of control plane data include feedback data comprising error signals used for adapting signal processing functionality, status information, and feedback related to adaptive coding and modulation functionality.

It is further appreciated that, according to some aspects, dummy data herein refers to proprietary data other than payload data, i.e., according to some aspects dummy data is data generated by the radio link transceiver and not data received from an external entity for transport over the radio link hop. Then, equivalently, dummy data can also be referred to, e.g., as proprietary data, pilot data, or idle data.

According to some other aspects discussed in more detail below, the dummy data may be derived from payload data, for instance as a portion of the payload data. Thus, in such cases, transmission of payload data is actually maintained. In the context of the present disclosure, transmission of dummy data does not necessarily imply transmission of redundant data nor does it imply that the transmitted data is void of useful data; payload data could be comprised in the transmission of dummy data from a sending network node, i.e., from the first microwave network node, but will be perceived as dummy data at a receiving node, i.e., at the second microwave network node. According to aspects of the disclosure, transmission of dummy data is derived from payload data, e.g., by transmitting payload data at a data rate below the configured lowest acceptable payload data rate or by using a portion of the payload data as dummy data. According to other aspects of the disclosure, redundant data could be multiplexed with actual payload data.

Even though data sent from the sending network node could include payload data, as disclosed above, the present disclosure is based on a perception of the received data as dummy data in the receiving network node. According to aspects of the disclosure, the receiving network node, in the content of this disclosure presented as the second microwave network node, is configured to perceive the received data as dummy data; e.g., when the data is received at a data rate below a configured lowest data rate. When perceived to represent dummy data, the received data will not be forwarded in the microwave network. According to a further aspect of the disclosure, information is distributed within the network that the link is down so that other microwave links may be used for the payload data transmission.

According to one aspect, transmission is upheld on the microwave link by transmitting dummy date, e.g., idle data or any other type of data unrepresentative of actual user data. Consequently, the microwave link connection is maintained, allowing for a faster lock-in time and improved link performance due to the already up and running signal processing functions, such as automatic transmit power control, ATPC, and digital pre-distortion, DPD, when the microwave link becomes available for true user data transmission again, i.e., when a current data rate is on or above a configured payload data rate.

According to some other aspects, the dummy data comprises the payload or user data, or part of the payload or user data. According to such aspects, the network is informed that the link has gone down, i.e., no payload data will be forwarded from the radio link, although payload data, or part of the payload data, still traverses the link.

According to some aspects, the dummy data is derived based on the payload data.

According to some aspects, the dummy data is generated by means of a pseudo-noise (PN) generator, or pre-stored in memory. Said dummy data preferably resembles normal payload traffic in terms of time-correlation properties and the like.

According to some aspects, the transmitted dummy data is known at the microwave radio link receiver, and thus essentially represents an all-out pilot transmission scheme. This further improves robustness of the microwave radio link to outage.

Information on a current data rate capability is, e.g., obtained S41, directly or indirectly, from a communications signal received in a microwave network node comprising a microwave link controller, see illustration in FIG. 3. Such information comprises a modulation order and/or coding providing for an undisrupted payload data transfer; a determined or estimated bandwidth of the microwave link; or a determined or estimated SNR.

The current data rate capability is compared in step S43 to the configured payload data rate. Turning back to FIG. 2, on a sunny day the current data rate capability may be expected to be on or above a configured payload data rate, e.g., a minimum transmission rate for payload data. However, during extreme weather conditions or other types of fading conditions, the current data rate capability will be expected to drop below the configured payload data rate. In the context of this disclosure, payload data represents user plane data. Control plane data required to maintain the microwave link connection is not considered when assessing the configured payload data rate.

When the result of the comparison between a current data rate and a configured payload data rate shows that the microwave link has been attenuated to such a degree that it is no longer possible to uphold transmission at the payload data rate, or that other detrimental effects such as interference are too strong, transmission on the microwave link is adapted in step S47. The adapting comprises transmitting dummy data on the microwave link between the first and second microwave network node. According to aspects of the disclosure, transmission on the microwave link is adapted in that the dummy data is transmitted in lieu of the payload data. This way, the network will perceive a radio link in a down state, and so, e.g., maintain stability, but since the microwave link is being kept alive by means of dummy data transmission at a reduced rate, the time to restore the link when conditions again improve will be reduced.

Turning back to FIG. 3, the illustrated redundant network configuration 30 is, according to an aspect of the disclosure, used to reroute payload data on a microwave link from the first network node 31 to a third network node 33 when a current data rate capability is below the configured payload data rate. For a situation where the payload data is destined for the second network node 32, the third network node 33 relays the data over the point-to-point connection between the third 33 and the second 32 network node.

Turning back to FIG. 4, optional operations of the disclosed method comprises rerouting S45a the payload data on a microwave link from the first network node to a third network node when a current data rate capability is below the configured payload data rate.

According to a further aspect of the present disclosure, transmission of payload data on the microwave link is disabled when the current data rata capability is below the configured payload data rate. In a microwave link controller arrangement that will be further discussed below, such disabling is performed by means of a multiplexer. The multiplexer is configured to select dummy data or payload data for transmission on a single output line depending on the current data rate capability of the microwave link.

As previously discussed, the disclosed method is not limited to a specific modulation and coding configuration of the microwave link, but is applicable to transmissions at a fixed payload data rate or a configured payload data rate of a microwave link arranged for adaptive coding, adaptive modulation, or adaptive coding and modulation, ACM, or adaptive coding, modulation and baud rate, ACM(B). In the latter case, the dummy data will be transmitted at a preconfigured lower transmission rate, e.g., a transmission rate below a lowest allowable transmission rate for payload data transmission.

According to an aspect of the disclosure, using ACM(B), a lower modulation order is selected when the current data rate capability is below the configured payload data rate, and a higher modulation order is selected when the current data rate capability is at or above the configured payload data rate. According to another aspect, a modulation order and/or a coding with a lower spectral efficiency in terms of bits/sec/Hz is selected when the current data rate capability is below the configured payload data rate, and a higher spectral efficiency in terms of bits/sec/Hz is selected when the current data rate capability is at or above the payload data rate.

As previously discussed, information on current data rate capability comprises a modulation order and/or coding providing for an undisrupted payload data transfer; a determined or estimated bandwidth of the microwave link; or a determined or estimated SNR or SINR. According to aspects of the disclosure, a current data rate capability below the configured payload data rate is indicative of a bandwidth reduction of the microwave link, e.g., through deteriorating external conditions. Other implications from a current data rate capability below the configured payload data rate are signal-to-noise-ratio, SNR, reduction on the microwave link and/or increased interference.

According to the above presentation, the dummy data is comprised in the user plane data. However, according to aspects of the disclosure, the control plane data is unaffected by this operation and is transmitted on the microwave link. Consequently, unless there is a complete microwave link failure, e.g., due to malfunctioning in a transceiver, the traffic control plane is upheld even when the microwave link suffers severe attenuation. For the more common situation where the microwave link loss represents the inability to transmit at a configured payload data rate, control plane data will still be transmitted on the microwave link. According to aspects of the disclosure, the control plane data is transmitted at any lower order modulation, including binary phase shift keying, BPSK, and quadrature amplitude modulation 4QAM and 16QAM, or at a default lowest order modulation of BPSK, or of QAM, e.g., 4 or 16 QAM. According to aspects of the disclosure, the ACM(B) profile is only lowered as much as needed, i.e. if user configured lowest modulation, or fixed modulation, is 1024 QAM and the link is incapable of this lowest modulation but capable of 256QAM, transmission will according to aspects of the disclosure be performed with 256 QAM. According to aspects of the disclosure, the control plane data is transmitted with a default coding rate.

According to aspects of the present disclosure, the method is applicable to microwave links providing high capacity backhaul links in a wireless communication network. A microwave link may be provided between small radio base stations, RBSs, of a wireless communication network, e.g., between pico eNBs of a 3GPP LTE network.

Turning back to FIG. 4, the above disclosed operations are according to aspects of the disclosure repeated or repeatedly performed, i.e., repeating the step of obtaining S41 information indicative of a current data rate capability of the microwave link, comparing S43 the current data rate capability to the configured payload data rate. When the current data rate capability is on or above the configured payload data rate, transmission of payload data is resumed on the microwave link. When resuming transmission of payload data, transmission of dummy data is disabled by the microwave link controller.

Turning back to FIG. 3, the person skilled in the art will understand that the disclosed operations are applicable also for further microwave links controlled from the same microwave link controller.

The disclosed methods are advantageously performed under the control of a computer program, stored on any suitable storage means for a computer program product, e.g., stored on a computer readable medium such as a compact disc, a digital versatile disc or in a computer memory, e.g., a RAM memory.

Figure 6:
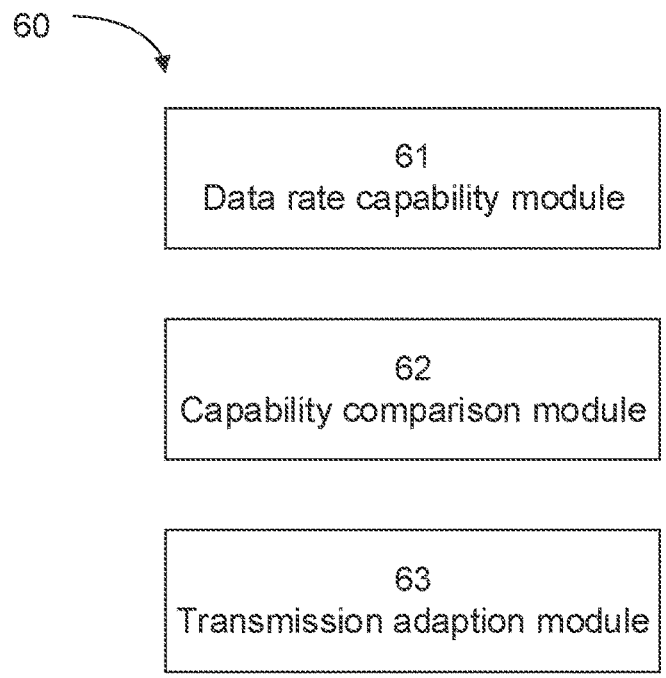
Figure 7:
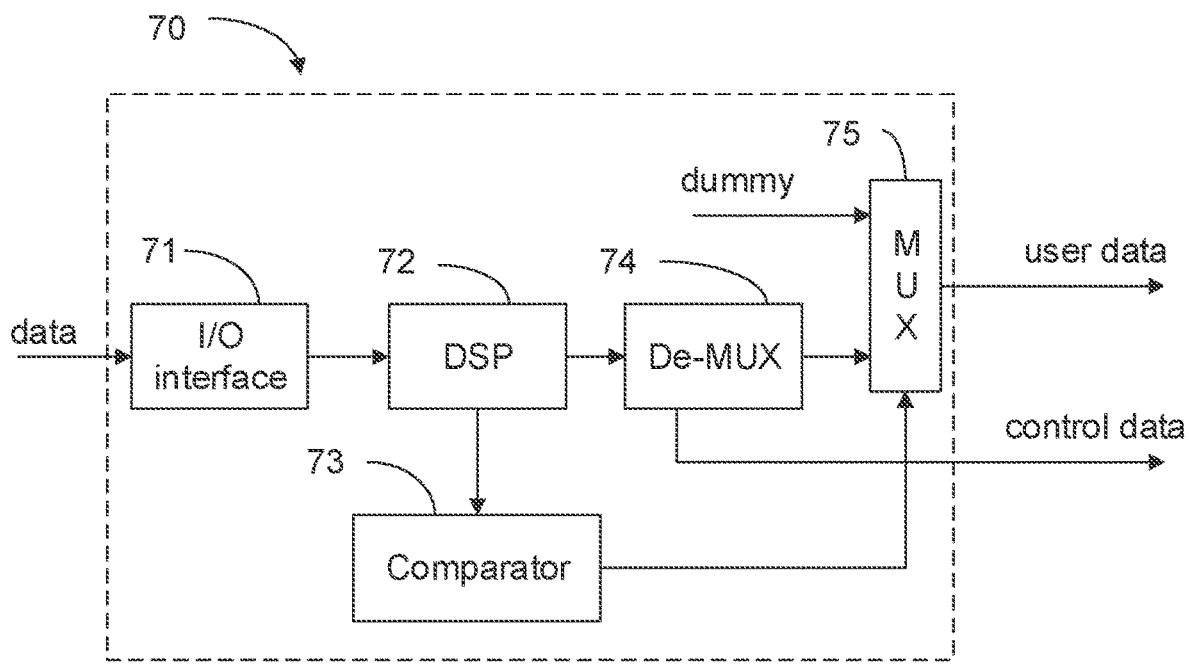

FIGS. 5-7 illustrates microwave link controller arrangements configured to control point-to-point microwave transmission on a microwave link configured for payload data transmission at a payload data rate between a first and a second microwave network node.

FIG. 5 discloses one embodiment of a microwave link controller 50. The microwave link controller 50 comprises processing circuitry 51, e.g., a processor 511 and a memory 512. The processing circuitry 51 is configured to obtain information indicative of a current data rate capability of the microwave link and to compare the current data rate capability to the configured payload data rate. When the current data rate capability is below the configured payload data rate, the processing circuitry 51 is configured to adapt transmission on the microwave link to comprise transmission of dummy data on the microwave link between the first and second microwave network node.

In an embodiment, e.g. applicable in the microwave link controller 50 of FIG. 5, the microwave link controller is configured to perform the method operations disclosed in the discussion of FIG. 4 when running instructions of a computer program received by means of a computer readable storage medium.

FIG. 6 discloses a functional module embodiment of a microwave link controller 60. The microwave link controller 60 comprises a data rate capability module 61 configured to obtain information indicative of a current data rate capability of the microwave link and a capability comparison module 62 configured to compare the current data rate capability to the configured payload data rate. When the current data rate capability is below the configured payload data rate, a transmission adaption module 63 of the microwave controller is configured to adapt transmission on the microwave link to comprise transmission of dummy data on the microwave link between the first and the second microwave network node.

FIG. 7 discloses an embodiment of a microwave link controller 70, e.g., implemented as an integrated circuit. The microwave link controller comprises an I/O interface 71, a digital signal processor 72, a comparator 73, a de-multiplexing unit 74 and a multiplexing unit 75. The I/O interface 71 is configured to receive a data signal on a microwave link. The digital signal processor 72 is configured to obtain information indicative of a current data rate capability by processing the data signal. The comparator 73 is configured to receive the current data rate capability from the digital signal processor and to compare the current data rate capability to a configured payload data rate, i.e., the actual received modulation, coding and baud to configured values. The de-multiplexing unit 74 is configured to separate payload data and control data received from the digital signal processor. The multiplexing unit 75 is configured to multiplex dummy data, e.g., an idle pattern or similar, with payload data on the microwave link when the current data rate capability is below the configured payload data rate.

As previous mentioned, FIG. 3 discloses a microwave network comprising a plurality of microwave network nodes 31, 32, 33 arranged in a redundant configuration for point-to-point communication between the network nodes. Turning back to FIG. 3, this Figure also provides an illustration of the microwave network nodes 31, 32, 33 configured for the point-to point communication of payload data. Each microwave network 31 node comprises a communication interface comprising one or more microwave transceivers 31a, 31b; 32a, 32b; 33a, 33b and a microwave link controller 31c, 32c, 33c according to any of the above disclosed microwave link controller arrangements.

Performing the method operations discussed in relation to FIG. 4, a communications signal is received in the communications interface of the network node. Using the microwave link controller arrangement of FIG. 7, the communications signal is received in the I/O interface of the microwave link controller. Information on the current data rate capability is obtained in the digital signal processor 72 by processing the received communications signal data signal, e.g., as previously presented in the present disclosure. The digital signal processor 72 is configured to transmit the current data rate capability to a receiving comparator. The comparator 73 controls a the multiplexing unit 75 so that transmission of dummy data is enabled or disabled based on the result from the comparison, i.e., when the current data rate capability is below a configured payload data, the comparator enables transmission of dummy data. The data to be transmitted on the microwave link is provided from the digital signal processor, such data comprising user plane data as well as control plane data. A de-multiplexing unit 74 is used to separate user plane data, i.e., payload data, from control plane data. The microwave link controller provides the control plane data and user plane data to the communications interface of the microwave network node for transmission on a microwave link. Thus, transmission of control plane data may be maintained even when dummy data replaces payload data in the user plane. Thus, the present disclosure provides for improved microwave link control allowing the microwave network nodes to maintain their connection even when a current data rate capability of the microwave link is below a lowest allowed data rate of the microwave link. Furthermore, the present disclosure prevents actual link loss since the connection is in fact maintained in a control plane.

The disclosed method provides improvements when using ACM(B), but also for microwave link configurations using fixed modulation and coding. In particular, the present disclosure provides improved support for fixed order high modulations, e.g., 4096 QAM or more. Using the method and arrangements presented herein, the a digital signal processor or processing circuitry of the microwave link controller, will be able to set up a connection and correct for errors at lower modulations in a transmission mode wherein low modulation dummy data is used for the user plane data.

The invention claimed is:

1. A method, performed in a microwave link controller, for controlling point-to point microwave transmission on a microwave link between a first microwave network node and a second microwave network node, wherein the microwave link is configured for transmission of payload data at a configured payload data rate, the method comprising:
    obtaining information indicative of a current data rate capability of the microwave link;
    comparing the current data rate capability of the microwave link to the configured payload data rate of the microwave link; and
    responsive to the current data rate capability of the microwave link being below the configured payload data rate of the microwave link, adapting transmission on the microwave link to transmit dummy data on the microwave link between the first microwave network node and the second microwave network node.

2. The method of claim 1, wherein adapting transmission on the microwave link comprises transmitting, on the microwave link, the dummy data in lieu of the payload data responsive to the current data rate capability being below the configured payload data rate.

3. The method of claim 2, further including
    rerouting the payload data from the microwave link between the first microwave network node and the second microwave network node to a microwave link from the first microwave network node to a third microwave network node responsive to the current data rate capability being below the configured payload data rate.

4. The method of claim 1, wherein transmission of payload data on the microwave link is disabled responsive to the current data rate capability being below the configured payload data rate.

5. The method of claim 1, wherein the configured payload data rate is a fixed payload data rate and wherein the dummy data is transmitted at a data rate below the fixed payload data rate responsive to the current data rate capability being below the configured payload data rate.

6. The method of claim 5, wherein the microwave link is arranged for adaptive coding, adaptive modulation, or adaptive coding and modulation, ACM, or adaptive coding, modulation and baud rate, ACM(B), and wherein the dummy data is transmitted at a pre-configured lowest transmission rate or at a transmission rate below the fixed payload data rate responsive to the current data rate capability being below the configured payload data rate.

7. The method of claim 6, wherein adapting transmission on the microwave link comprises selecting a lower modulation order responsive to the current data rate capability being below the configured payload data rate, and selecting a higher modulation order when the current data rate capability is at or above the configured payload data rate.

8. The method of claim 6, wherein adapting transmission on the microwave link comprises selecting a modulation order and/or a coding with a lower spectral efficiency in terms of bits/sec/Hz responsive to the current data rate capability being below the configured payload data rate, and selecting a higher spectral efficiency in terms of bits/sec/Hz when the current data rate capability is at or above the configured payload data rate.

9. The method of claim 1, further comprising repeating obtaining the information indicative of the current data rate capability of the microwave link, comparing the current data rate capability to the configured payload data rate; and transmitting payload data on the microwave link responsive to the current data rate capability is on or above the configured payload data rate.

10. The method of claim 1, wherein the current data rate capability being below the configured payload data rate is indicative of a bandwidth reduction of the microwave link.

11. The method of claim 1, wherein the current data rate capability being below the configured payload data rate is indicative of a signal to noise ratio, SNR, reduction of the microwave link.

12. The method of claim 1, wherein the current data rate capability being below the configured payload data rate is indicative of an increase in interference of the microwave link.

13. The method of claim 1, where adapting transmission on the microwave link further comprises transmitting control plane data on the microwave link.

14. The method of claim 13, wherein the control plane data is transmitted at a default lowest order modulation of binary phase shift keying, BPSK, or 4 or 16 quadrature amplitude modulation, QAM.

15. The method of claim 1, wherein the microwave link is a high capacity backhaul link and the first microwave network node and the second microwave network node are small radio base stations, RBSs, of a wireless communication network.

16. The method of claim 15, wherein the first microwave network node and the second microwave network node are pico eNBs of a 3GPP LTE network.

17. The method of claim 1, wherein the microwave link controller is further arranged to control transmission on at least a further microwave link between nodes of a microwave network.

18. A microwave link controller configured to control point-to-point microwave transmission on a microwave link configured for transmission of payload data at a configured payload data rate between a first microwave network node and a second microwave network node, the microwave link controller comprising:
processing circuitry configured to:
obtain information indicative of a current data rate capability of the microwave link;
compare the current data rate capability of the microwave link to the configured payload data rate of the microwave link; and
responsive to the current data rate capability of the microwave link being below the configured payload data rate of the microwave link, adapt transmission on the microwave link to transmit dummy data on the microwave link between the first microwave network node and the second microwave network node.

19. The microwave link controller of claim 18, wherein the processing circuitry comprises a processor and a memory containing instructions executable by said processor.

20. A microwave link controller comprising:
an I/O interface configured to receive a data signal on a microwave link;
a digital signal processor configured to obtain information indicative of a current data rate capability of the microwave link by processing the data signal;
a comparator configured to receive the current data rate capability of the microwave link from the digital signal processor and to compare the current data rate capability of the microwave link to a configured payload data rate of the microwave link;
a demultiplexer configured to separate payload data and control data received from the digital signal processor; and
a multiplexer configured to multiplex dummy data with payload data on the microwave link responsive to the current data rate capability of the microwave link being below the configured payload data rate of the microwave link.

* * * * *